Feb. 12, 1952        E. KAEPPLER        2,585,785
DEVICE FOR CONTROLLING THE SPEED OF MOTOR VEHICLES
Filed April 8, 1950        2 SHEETS—SHEET 1
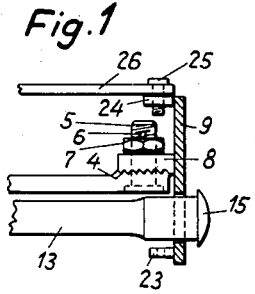
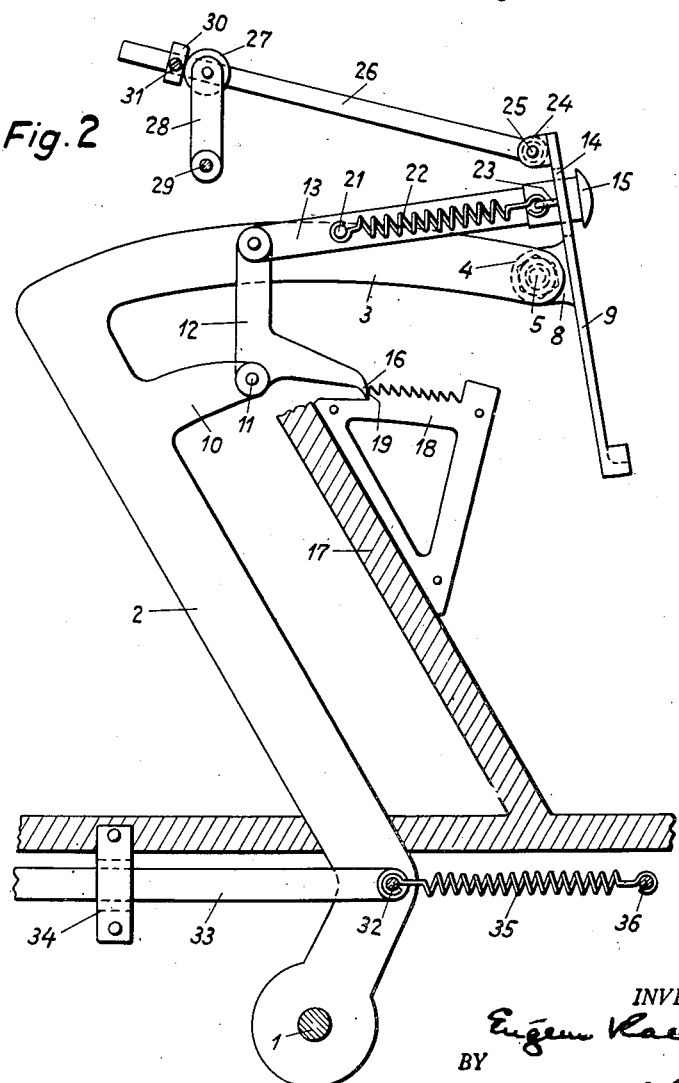
INVENTOR.
Eugen Kaeppler
BY Feb. 12, 1952     E. KAEPPLER     2,585,785
DEVICE FOR CONTROLLING THE SPEED OF MOTOR VEHICLES
Filed April 8, 1950     2 SHEETS—SHEET 2
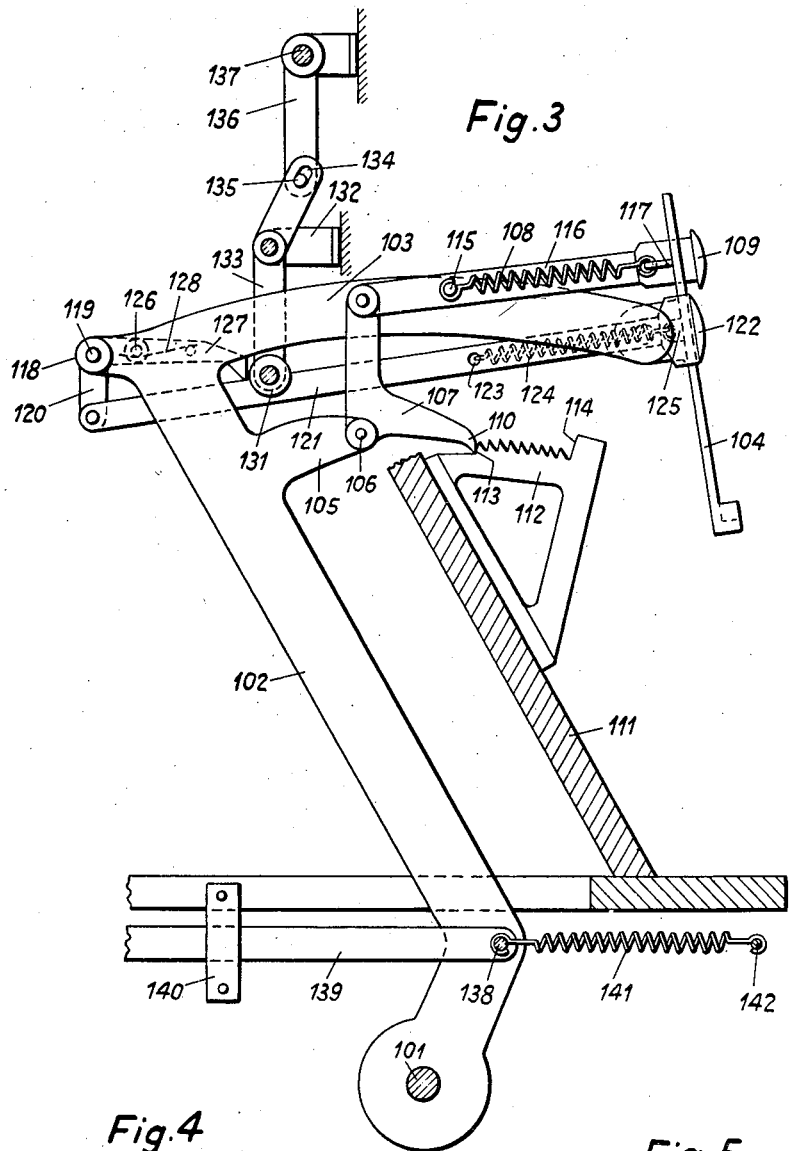
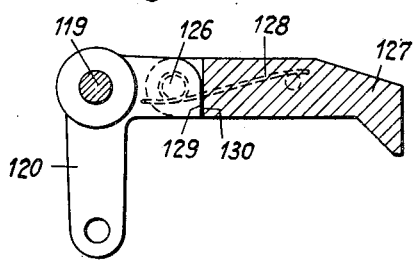
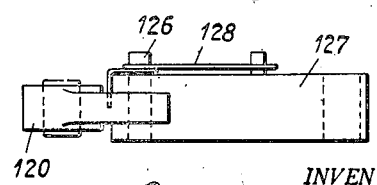
INVENTOR.
Eugen Kaeppler
BY Patented Feb. 12, 1952

2,585,785

UNITED STATES PATENT OFFICE 2,585,785

DEVICE FOR CONTROLLING THE SPEED OF MOTOR VEHICLES

Eugen Kaeppler, Lenzburg, Switzerland

Application April 8, 1950, Serial No. 154,755
In Switzerland January 14, 1950

6 Claims. (Cl. 192—3)

The invention relates to a device for controlling the speed of a motor vehicle, such as an automobile, coach or bus, lorry, truck or van.

It is the general object of the invention to provide a device for controlling both the acceleration and the braking of a motor vehicle by means of a single control member.

It is in particular an object of the invention to provide a device for controlling both the fuel supply to the engine of a motor vehicle, and the brakes of the motor vehicle, by a combined single control member.

It is another object of the invention to provide a control device which is operated in one and the same direction for increasing the fuel supply to the engine and for releasing any brake action, and in the opposite direction both for reducing the fuel supply to the engine and for applying the brakes to the vehicle.

It is a further object of the invention to provide a pedal control device which is operated instinctively by the driver reducing the speed of the vehicle by diminishing the fuel supply and braking when pressing down the pedal plate and increasing its speed by releasing the said brakes and accelerating the engine when releasing the said pedal.

It is still another object of the invention to provide a control mechanism which automatically controls the fuel supply to the engine and the brakes of the vehicle in succession, i. e. when operated in one direction releasing first the brakes and then increasing the fuel supply to the engine, and when operated in the reverse direction first to reduce the fuel supply to the engine and then to apply the brakes.

It is still another object of the invention to provide a control device for the speed of a motor vehicle by controlling both the brakes of the vehicle and the fuel supply to the engine thereof by a single common control member which when released from the braking condition automatically returns into a position wherein the brakes of the vehicle are released and the fuel supply to the engine is adjusted to the idling speed thereof.

It is still another object of the invention to provide a control device for the speed of a motor vehicle by controlling both the brakes of the vehicle and the fuel supply to the engine thereof by a single common control member which latter keeps the fuel supply to the said engine automatically constant at the amount adjusted last, when the said common control member is left to itself by taking off the body member of the driver (hand or foot) from the said common control member.

It is yet another object of the invention to provide a control device for the speed of a motor vehicle which device has a "dead man's" action by automatically reducing the fuel supply to the engine to idling conditions thereof as soon as the body member of the driver (foot or hand) is taken off the control device.

It is yet another object of the invention to provide a control device having a "dead man's" action as set forth hereinabove which is automatically returned to the normal operative condition for controlling the fuel supply to the engine and for controlling the brakes of a motor vehicle when the aforesaid body member of the driver is brought again into contact with the said control device.

With these general statements of the objects and purposes of my invention I will now proceed to describe some embodiments thereof and the manner in which my invention is carried out, and it will be understood that while I have described what may be considered as preferable embodiments of my invention I do not limit myself to the precise conditions or proportions herein set forth, as they may be varied by those skilled in the art in accordance with the particular purposes for which they are to be utilized.

In the accompanying diagrammatic drawings:

Fig. 1 is a lateral elevation of a device for operating the members controlling the speed of a motor vehicle by means of a single pedal operating the throttle valve as well as the vehicle brakes, Fig. 2 is a plan view of a detail of this device, Fig. 3 is a lateral elevation of a modification of the device shown in Fig. 1, Fig. 4 is a detail of the device according to Fig. 3 in lateral elevation, partly in section, shown on a larger scale, and Fig. 5 is a plan view of the detail shown in Fig. 4.

Referring first to Figs. 1 and 2, on an axle 1, which is stationarily arranged in the frame of the motor vehicle (not shown in the drawing), the end of a lever 2 is rotatably journalled which lever has an arc-shaped transverse arm 3 at its other end. The free end of the transverse arm 3 has an eye 4 the lateral face of which is radially serrated around its bore. On this eye 4 the bracket 8 of a pedal plate 9 is attached by means of a threaded bolt 5 and of a nut 7 screwed on to the latter and secured by a splint 6. The bracket 8 is on its lateral face adjacent the eye 4 likewise serrated radially this serrated face engaging the serrated face of the eye 4 in such a manner that the pedal plate 9 can be adjusted to any slope desired relatively to the transverse arm 3 of the lever 2 and can then be fixed in the position adjusted by tightening the nut 7 and by securing the latter by means of the splint 6. Below the transverse arm 3 the lever 2 has a further arm 10 on which a bell crank lever 12 is pivoted on an axle 11. On the end of one arm of the bell crank lever 12 a push rod 13 is articulated which penetrates through a slot 14 in the pedal plate 9 and on the end of which there is a push button 15 arranged in front of the pedal plate 9. The other arm of the bell crank lever 12 is designed as a locking pawl 16 which cooperates with a ratchet wheel segment 18 arranged on the lower, sloping part 17 of the bulkhead in front of the driver's compartment of the motor vehicle. The ratchet teeth of this ratchet wheel segment 18 extend forward, i. e. towards the sloped portion 17 of the bulkhead of the driver's compartment, right up to a shoulder 19, in front of which the ratchet wheel segment 18 has a smooth portion of a smaller radius than the ratchet teeth, and extend backward up to a stop 20. On a pin 21 inserted into the push rod 13 one end of a tension spring 22 is attached, the other end of which is attached to an eye 23 on the back of the pedal plate 9. This tension spring 22 pulls the push rod 13 towards the pedal plate and thereby causes the locking pawl 16 to be pressed against the ratchet wheel segment 18.

On an eye-bracket 24 on the back of the pedal plate 9 a rod 26 is articulated by means of a pivot pin 25 which rod penetrates through a transverse bore of a roller 27 and is shiftable therein. The roller 27 is pivoted on the free end of the carburetter control lever 28 which is arranged on an axle 29 operating the throttle valve (not illustrated in the drawing). On the end of the rod 26 projecting beyond the roller 27 an adjustable abutment collar 30 is fixed by means of a clamping screw 31.

In the portion of the lever 2 adjacent the axle 1 a bolt 32 is fixedly arranged, on which one end of a rod 33 is pivoted which rod forms part of the brake linkage (otherwise not shown in the drawing) and which is guided in a stationary guide 34 arranged in the frame of the motor vehicle. On the bolt 32 there is moreover attached one end of a tension spring 35 the other end of which is attached to a stationary bolt 36 fixed to the frame of the motor vehicle, which tension spring 35 pulls the lever 2 backwards. Instead of this tension spring 35 a torsion spring could be alternatively provided on the axle 1.

In Fig. 1 of the drawing the device is illustrated in the rest position in which the throttle valve is adjusted to idling speed of the engine. The slope of the pedal plate 9 relatively to the transverse arm 3 of the lever 2 can be so adjusted as it suits the driver of the motor vehicle best. Accordingly the abutment collar 30 on the rod 26 is so adjusted that, in the idling position as shown, it just abuts on the roller 27 when the throttle valve, which owing to spirng- or weight bias, has the tendency of closing, is adjusted for idling speed of the engine. By the tension spring 22 acting on the push rod 13 the locking pawl 16 of the bell crank lever 12 is pressed towards the toothed segment 18, and the lever 2 is pulled backwards by the tension spring 35. The locking pawl 16 then abuts on the shoulder 19 of the ratchet wheel segment 18 and prevents any further recession of the lever 2.

By operating the starter, the engine is set into motion and runs now at idling speed. In order to set the motor vehicle into motion the driver puts his foot on to the pedal plate 9 and presses thereby the push button 15 into the said pedal plate 9. Thereby the bell crank lever 12 is turned about its axle 11 in such a manner that its locking pawl 16 is lifted off the ratchet wheel segment 18. Accordingly the locking which prevented any further recession of the lever 2 on its axle 1 is now released and by the action of the tension spring 35 which is considerably stronger than the tension spring 22, the pedal plate arranged on the transverse arm 3 of the lever 2 is moved back as far as permitted by the foot of the driver of the motor vehicle. In this backward movement of the pedal plate 9 the throttle lever 28 is turned about its axle 29 by the abutment arranged on the rod 26 which has the effect that the throttle valve is opened. The further the driver's foot is withdrawn, the more the throttle valve is open, until eventually, when the locking pawl 16 abuts on the stop 20, the fully open of the throttle position is reached.

The driver of the motor vehicle can release the push button 15 in any intermediate position of the pedal plate 9 between idling speed and full throttle by slightly turning his foot sideways whereby the locking pawl 16 of the bell crank lever 22 engages the ratchet wheel segment 18 under the action of the tension spring 22. This causes the throttle valve to be arrested in this position, whereby the supply of gas to the engine is kept constant. When the driver of the motor vehicle wishes, or is forced, to brake suddenly, he need not as hitherto leave with his foot the gas pedal and change over to the brake pedal, but he merely presses the pedal plate 9 energetically forward. As soon as the idling speed position of the lever 2 is passed, the brakes of the motor vehicle are applied through the rod 33. The stopping of the vehicle is then effected by braking i. e. by pressing further forward the pedal plate 9. As soon as the vehicle has come to a standstill the driver releases firstly the push button 15 by turning his foot sideways, and subsequently releases also the pedal plate 9. Thereby firstly the locking pawl 16 of the bell crank lever 12 is pressed against the forward, smooth portion of the ratchet wheel segment 18 by the action of the tension spring 22 whereupon the lever 2 recedes until the locking pawl 16 abuts again against the shoulder of the toothed segment 18.

The engine runs then at idling speed.

Referring now to the modified embodiment illustrated in Figs. 3 to 5, the axile 101 is again arranged stationarily in the frame (not shown in the drawing) of the motor vehicle, and on it one end of a lever 102 is rotatably journaled, which lever as an arc-shaped transverse arm 103 at its other end. On the free end of this transverse arm 103 a pedal plate 104 is adjustably arranged. Below the transverse arm 103 the lever 102 has a further arm 105 on which an axle 106 is arranged whereon a bell crank lever 107 is rotatably pivoted. On the end of one arm of the bell crank lever 107 a push rod 108 is articulated which penetrates through a slot of the pedal plate 104 and which carries a push button 109 on the end projecting in front of the pedal plate 104. This push button 109 lies on the upper portion of the pedal plate 104 near its left hand side edge. The other arm of the bell crank lever 107 is designed as a locking pawl 110 which cooperates with the ratchet wheel segment 112 arranged fixedly on the lower, sloping portion 111 of the bulkhead in front of the driver's compartment of the motor vehicle. The ratchet teeth of this ratchet wheel segment 112 extend forward, i.e. towards the sloping portion 111 of the bulkhead, right up to a shoulder 113 in front of which the ratchet wheel segment 112 has a smooth portion lying lower than its ratchet teeth, and extend backward up to a stop 114. On a pin 115 inserted into the push rod 108 one end of a tension spring 116 is attached, the other end of which is attached to an eye 117 on the back of of the pedal plate 104. This tension spring 116 pulls the push rod 108 towards the pedal plate 104 and thereby causes the locking pawl 110 to be pressed against the ratchet wheel segment 112.

On an eye 118 at the upper end of the lever 102 a ball crank lever 120 is rotatably pivoted on an axle 118, on one arm of which a push rod 121 is articulated which penetrates through a slot in the pedal plate 104 and carries a push button 122 at its end in front of the pedal plate 104. This push button 122 lies below the push button 109 and in the centre of the pedal plate 104. On a pin 123 inserted into the push rod 121 one end of a tension spring 124 is attached, the other end of which is attached to an eye 125 on the back of the pedal plate 104, which tension spring 124 pulls the pin 123 arranged on the push rod 121 towards the pedal plate 104.

On the other arm of the bell crank lever 120 a locking pawl 127 is pivoted on an axle 126, which pawl is pressed by a spring 128 into its lower end position, the faces 129 of the arm of the bell crank lever 120 and 130 of the locking pawl 127 abutting against one another (Fig. 4). This locking pawl 127 can be rocked upwards against the action of a spring 128 which is not strong. On the front face of the end of the locking pawl 127, which forms a downward directed wedge, a roller 131 (Fig. 3) abuts, which is journalled on the end of one arm of a two armed lever 133 which latter is pivoted on a bracket 132. In the end of the other arm of this lever 133 a slot 134 is provided into which a pin 135 engages which pin is arranged at the end of a lever 136. This lever 136 is attached fixedly on a shaft 137 through which the throttle valve (not shown in the drawing) of the engine of the motor vehicle is operated, which valve is kept in the closed position by a spring. On the lever 102 a rod 139 is articulated on an axle pin 138 which rod 139 forms part of the brake linkage and is guided in a guide 140 arranged on the frame of the vehicle. On the pin 138 one end of a tension spring 141 is attached, the other end of which is attached on a pin 142 arranged on the frame of the vehicle. By this tension spring 141 the lever 102 is pulled back so far that the locking pawl 110 abuts on the shoulder 113 of the ratchet wheel segment.

The device is illustrated in the drawing in the position which corresponds to the idling run of the engine. The driver's foot (not shown in the drawing) is then placed on the pedal plate 104 but in a position slightly turned sideways towards the right in such a manner that it presses-in the push button 122, but not the push button 109. By pressing-in the push button 122 the locking pawl 127 is brought, by means of the push rod 121 and the bell crank lever 120, into such a position, that its front face abuts against the roller 131 of the lever 133. The throttle valve is then closed. The locking pawl 110 is pressed against the ratchet wheel segment 112 by the spring 116 acting on the push rod 108. By the tension spring 141, the lever 102 is pulled towards the driver until the locking pawl 110 abuts against the shoulder 113 of the ratchet wheel segment 112. By operating the starter the engine is set into motion and runs now at idling speed.

In order to set the vehicle into motion the driver now turns his foot bearing on the pedal plate 104 in such a way that it engages the push button 109, too, and presses it in. Thereby the bell crank lever 107 is turned on its axle 106 in such a manner that its locking pawl 110 is lifted off the ratchet wheel segment 112. Accordingly the locking of the lever 102, which prevented its being tilted further back on its axle 101, is released and by the action of the tension spring 141 which is considerably stronger than the tension spring 116, the pedal plate 104 which is attached on the transverse arm 103 is moved backwards i.e. towards the driver as far as the driver's foot permits. In this movement of the lever 102 and of its transverse arm 103 the locking pawl 127 pushes the roller 131 ahead of it which has the effect that the shaft 137 is turned by the lever 133 and by the lever 136, whereby the throttle valve is opened. The further the driver's foot is withdrawn the more the throttle valve is opened, until eventually, when the locking pawl 110 abuts on the abutment 114, the fully open position of the throttle is reached.

The driver can release the push button 109 in any intermediate position of the pedal plate 104 between idling run and full throttle by slightly turning his foot sideways to the right whereby the locking pawl 110 of the bell crank lever 107 engages the ratchet wheel segment 112 under the action of the tension spring 116. This causes the throttle valve to be arrested in the actual position so that the supply of gas to the engine is maintained constant.

If the driver wishes, or is forced to, brake suddenly he need not as hitherto usual leave the gas pedal with his foot and transfer the latter to the brake pedal, but simply presses the pedal plate 104 energetically forward. As soon as thereby the idling run position of the lever 102 is passed, the brakes of the vehicle are applied through the rod 139.

When the foot of the driver leaves the pedal plate by reasons unforeseen, e. g. owing to a collision or any other accident, the push button 122 is released. By the action of the tension spring 124 the push rod 121 is then moved towards the pedal plate 104, and the bell crank lever 120 is turned on its axle 119 in such a manner that the locking pawl 127 is lifted. Although by the locking pawl engaging the ratchet wheel segment 112 the lever 102 is detained in its position for full throttle or in an intermediate position between full throttle and idling speed, the throttle valve closes now at once under the action of its biassing spring, because the roller 131 is held by the locking pawl 127 no longer, the latter being lifted off; the said roller 131 can now pass under the said pawl 127 into the position corresponding to idling speed. The vehicle is stopped thereby. The roller 131 comes to lie behind the wedge formed by the end of the locking pawl 127, but gets again into its correct position ahead of the front face of the locking pawl 127 at the next forward movement of the pedal plate 104, since the said pawl 127 is lifted off the roller 131 in this movement against the action of the weak spring 128, and allows this roller 131 to pass below it.

While the two embodiments described hereinabove are specifically for motor vehicles with gasoline engines having throttle valves, it is obvious that the invention can be used likewise in connection with diesel engines where the fuel injection is controlled or with other types of engines having another kind of fuel supply control.

As stated hereinbefore, I wish it to be understood that I do not desire to be limited to the exact details of construction shown and described, for obvious modifications will occur to a person skilled in the art.

What I claim as my invention and desire to secure by Letters Patent, is:

1. A device for controlling the speed of a motor vehicle, comprising combination, fuel control means arranged for increasing the fuel supply to the engine of the motor vehicle when operated in one direction and for reducing said fuel supply down to idling speed conditions of the said engine when operated in the opposite sense, brake control means arranged for releasing the brakes of the motor vehicle when operated in one direction and for applying the said brakes when operated in the opposite direction, a common control member operatively connected with the said fuel control means and with the said brake control means, biasing means arranged for automatically moving the said common control member in the direction of releasing the said brakes and of increasing the said fuel supply, detent means arranged for arresting the said common control member in a position for releasing both the said brake control means in a non-braking position and the said fuel control means in an idling speed position, override control means arranged for overriding, when positively operated, the said detent means and for allowing the said biasing means to move the said common control member in a direction of serving the said fuel control means into a position of increased fuel supply while leaving the said brake control means in a non-braking position, and biasing means for the said override control means arranged for rendering the said override control means inoperative when not positively operated, and for allowing the said detent means to arrest the said common control member in a plurality of positions, each of said positions corresponding to a position of the said fuel control means between idling speed and full throttle condition of the engine of the motor vehicle.

2. A device for controlling the speed of a motor vehicle, comprising in combination: fuel control means arranged for increasing, when positively operated, the fuel supply to the engine of the motor vehicle, first biassing means arranged for biassing the said fuel control means towards a position corresponding to an idling speed condition of the said engine, brake control means arranged for applying, when positively operated, the brakes of the motor vehicle, a common control member arranged for positively operating the said fuel control means when moved in one direction and the said brake control means when moved in the opposite direction, second biassing means arranged for biassing the said common control member in the direction for positively operating the said fuel control means and for overriding the said first biassing means, and biassed release means on the said common control member arranged for releasing, when positively operated, the said fuel control means from the overriding effect of the said second biassing means.

3. A device for controlling the speed of a motor vehicle, comprising in combination: fuel control means arranged for increasing, when positively operated, the fuel supply to the engine of the motor vehicle, first biassing means arranged for biassing the said fuel control means towards a position corresponding to an idling speed condition of the said engine, brake control means arranged for applying, when positively operated, the brakes of the motor vehicle, a common control member arranged for positively operating the said fuel control means when moved in one direction and for positively operating the said brake control means when moved in the opposite direction, second biassing means arranged for biassing the said common control member in the direction for positively operating the said fuel control means and for releasing the said brake control means, the said second biassing means being more powerful than the said first biassing means, biased detent means arranged on and for arresting the said common control member in a plurality of positions, each of said positions corresponding to a position of the said fuel control means between an idling speed and full power condition of the said engine when the said detent means are not positively operated, and biassed release means on the said common control member arranged for releasing, when not positively operated, the said fuel control means from the effect of the said more powerful second biassing means.

4. A device for controlling the speed of a motor vehicle, comprising in combination: a single pedal lever pivoted on the frame of the said motor vehicle, a spring arranged for biassing the said pedal lever against being depressed by the foot of the driver of the vehicle, a pedal plate arranged angularly adjustable on the said pedal lever, the said pedal lever and the said pedal plate forming together a single pedal member, linkage arranged for operatively connecting the said pedal member to the brakes of the motor vehicle, linkage arranged for operatively connecting with lost motion the said pedal member to the fuel supply control member of the engine of the motor vehicle, a bell crank lever pivoted on the said pedal lever, a push rod articulated to one arm of the said bell crank lever and passing through a slot in the said pedal plate, a push button arranged on the free end of said push rod in front of the said pedal plate, a locking pawl arranged on the end of the other arm of the said bell crank lever, a segment fixedly attached to the frame of the motor vehicle and having a smooth section, a ratchet section stepped-up to a radius larger than that of the said smooth section and a stop stepped-up to a radius larger than that of the said ratchet section, a spring arranged for biassing the said bell crank lever in a direction for raising the said push button above the said pedal plate and for pressing the said locking pawl against the said segment, the said locking pawl resting on the said smooth section where the latter is stepped-up when the said pedal plate and the said push button are released by the driver's foot whereby the said pedal is arrested in a position corresponding to a non-braking condition of the vehicle brakes and to an idling speed condition of the vehicle engine while the said lost motion connection allows the depressing of the said pedal to a position for applying the vehicle brakes without affecting the idling speed position of the said fuel control means, and the said locking pawl being lifted off the said smooth portion when the said push button is pressed into the said pedal plate by the driver's foot, whereby the said spring biassing the said pedal lever is allowed to let the pedal follow the driver's foot when receding, the said linkage connecting the said pedal to the fuel control means then adjusting the latter for an increased fuel supply.

5. A device for controlling the speed of a motor vehicle, comprising in combination, a single pedal lever pivoted on the frame of the said motor vehicle, a spring arranged for biasing the said pedal lever against being depressed by the foot of the driver of the vehicle, a pedal plate arranged angularly adjustable on the said pedal lever, the said pedal lever and the said pedal plate forming together a single pedal member, linkage arranged for operatively connecting the said pedal member to the brakes of the motor vehicle, linkage arranged for operatively connecting with lost motion the said pedal member to the fuel supply control member of the engine of the motor vehicle, a bell crank lever pivoted on the said pedal lever, a push rod articulated to one arm of the said bell crank lever and passing through a slot in the said pedal plate, a push button arranged on the free end of said push rod in front of the said pedal plate, a locking pawl arranged on the end of the other arm of the said bell crank lever, a segment fixedly attached to the frame of the motor vehicle and having a smooth section, a ratchet section stepped-up to a radius larger than that of the said smooth section and a stop stepped-up to a radius larger than that of the said ratchet section, a spring arranged for biasing the said bell crank lever in a direction for raising the said push button above the said pedal plate and for pressing the said locking pawl against the said segment, the said locking pawl resting on the said smooth section where the latter is stepped-up when the said pedal plate and the said push button are released by the driver's foot whereby the said pedal is arrested in a position corresponding to a non-braking condition of the vehicle brakes and to an idling speed condition of the vehicle engine while the said lost motion connection allows the depressing of the said pedal to a position for applying the vehicle brakes without affecting the idling speed position of the said fuel control means, and the said locking pawl being lifted off the said smooth portion when the said push button is pressed into the said pedal plate by the driver's foot, whereby the said spring biasing the said pedal lever is allowed to let the pedal follow the driver's foot when receding, the said linkage connecting the said pedal to the fuel control means then adjusting the latter for an increased fuel supply, a second push rod, a second push button arranged on the free end of the said second push rod in front of the said pedal plate, a spring arranged for raising the said second push button above the said pedal plate, a second bellcrank lever pivoted on the said pedal lever, one arm of the said second bell crank lever being articulated to the said second push rod, a second locking pawl arranged on the end of the other arm of the said second bell crank lever, a double-armed lever pivoted on the vehicle frame, and a roller arranged at one end of the said double-armed lever for co-operation with the said second locking pawl, the other end of the said double-armed lever being in lost-motion connection with the fuel control means of the engine of the motor vehicle, the said second locking pawl being out of range of the said roller when the said second push button is released, and abutting with its front face against the said roller when the said second push button is pressed-in, whereby it is adapted to push the said roller ahead of itself when the said pedal is allowed to follow the receding foot of the driver of the motor vehicle under the action of the said spring biassing the said pedal towards the driver, and to adjust the fuel supply control means of the vehicle engine for an increased fuel supply.

6. A device for controlling the speed of a motor vehicle as claimed in claim 5, comprising in combination: a wedge shaped end portion of the said second locking pawl, a spring arranged for biassing the said second pawl, the said second pawl being pivoted at the end of one arm of the said second bell crank lever and having an abutment face arranged for co-operation with an abutment face of the end of an arm of the said second bell crank lever in a sense of being capable merely of being rocked upwards by the said biassing spring.

EUGEN KAEPPLER.

REFERENCES CITED

The following references are of record in the file of this patent:

UNITED STATES PATENTS

| Number | Name | Date |
|---|---|---|
| 1,230,426 | Murray | June 19, 1917 |
| 1,406,402 | May | Feb. 14, 1922 |
| 1,507,540 | Williams | Sept. 2, 1924 |
| 1,608,382 | Fox | Nov. 23, 1926 |
| 1,636,851 | Collins | July 22, 1927 |
| 1,749,027 | Goldsmith | Mar. 4, 1930 |
| 1,817,416 | Leppert | Aug. 4, 1931 |
| 1,848,201 | Rook | Mar. 8, 1932 |
| 1,921,693 | Neville | Aug. 8, 1933 |
| 2,119,299 | Smith | May 31, 1938 |
| 2,224,441 | MacKay | Dec. 10, 1940 |

FOREIGN PATENTS

| Number | Country | Date |
|---|---|---|
| 450,738 | France | Apr. 2, 1913 |